Figure 1:
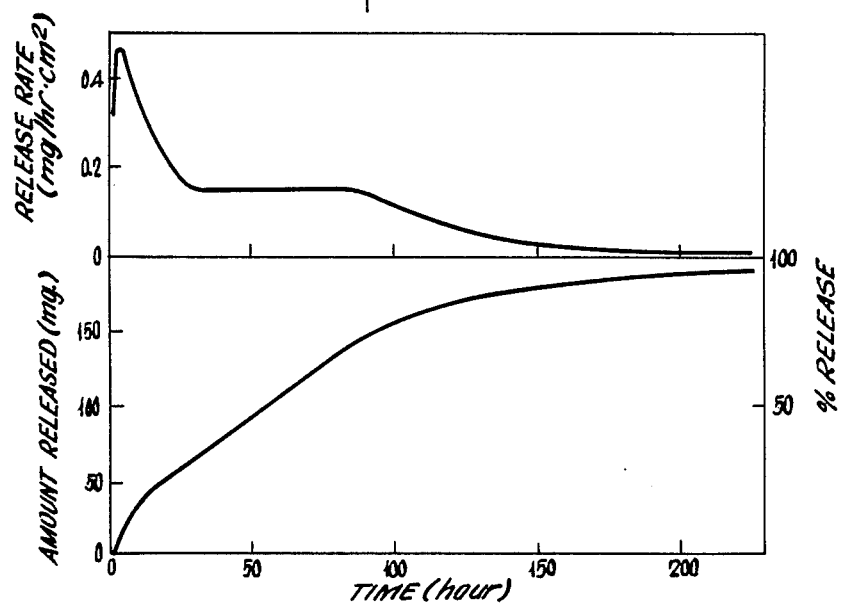

United States Patent [19]

Lee

[11] 4,289,815

[45] Sep. 15, 1981

[54] COLD WATER-INSOLUBLE POLYVINYL ALCOHOL POUCH FOR THE CONTROLLED RELEASE OF ACTIVE INGREDIENTS

[75] Inventor: Ping I. Lee, Valley Cottage, N.Y.

[73] Assignee: Airwick Industries, Inc., Carlstadt, N.J.

[21] Appl. No.: 35,369

[22] Filed: May 4, 1979

Related U.S. Application Data

[63] Continuation-in-part of Ser. No. 919,120, Jun. 26, 1978, abandoned.

[51] Int. Cl.³ .......................... B65D 1/20; B65D 11/20
[52] U.S. Cl. .......................................... 428/35; 252/90; 252/91; 252/92; 252/93; 252/95; 252/99; 252/174.24; 428/500; 128/260; 128/272; 206/0.84; 206/484; 236/6; 236/34; 236/57

[58] Field of Search ....................... 252/90, 91, 92, 93, 252/95, 99; 174/0.24; 428/500, 35; 128/260, 272; 206/484, 0.84; 236/6, 34, 57

[56] References Cited

U.S. PATENT DOCUMENTS

| 3,977,404 | 8/1976 | Theeuves ...................... 128/272 X |
| 4,011,172 | 3/1977 | Marsan et al. .................. 252/90 X |
| 4,170,565 | 10/1979 | Flesher et al. ................. 252/90 X |

FOREIGN PATENT DOCUMENTS 1285031  8/1972  United Kingdom .

*Primary Examiner*—Mayer Weinblatt
*Attorney, Agent, or Firm*—Harry Falber

[57] ABSTRACT

A pouch for the controlled release of active ingredients into an aqueous medium comprising liquid or solid active ingredients enclosed in a sealed envelope of cold water-insoluble polyvinyl alcohol.

12 Claims, 4 Drawing Figures

COLD WATER-INSOLUBLE POLYVINYL ALCOHOL POUCH FOR THE CONTROLLED RELEASE OF ACTIVE INGREDIENTS

RELATED APPLICATION

This application is a continuation-in-part of application Ser. No. 919,120, filed June 26, 1978, now abandoned.

It has become a common practice to package various active ingredients, such as detergents and bleaches, in pouches made from plastic films. Among the advantages of such pouches are their attractive appearance, the convenience of pre-measured amounts of active ingredient and the elimination of the need to work with dusty and/or hazardous bulk materials.

Various water-soluble and water-insoluble films have been utilized for this purpose. The most popular water-soluble film is polyvinyl alcohol which has been used to enclose dry materials such as detergents and bleaches. The packets are dropped into water whereupon the bags disintegrate to release the contents and the film material dissolves. Such water-soluble polyvinyl alcohol packets are disclosed, for example, in U.S. Pat. No. 3,198,740, No. 3,374,195 and No. 3,528,921. Disadvantages have, however, been encountered with these packets. Of primary significance, there has been little or no control over the rate of release of active ingredient. While a substantially one-shot release may be satisfactory for washing machine use, such a release pattern is totally inappropriate for a wide variety of applications which require prolonged and controlled release of active ingredient.

Water-insoluble plastics such as polyethylene, polypropylene, cellophane and polyvinyl chloride have also been utilized to prepare packets of active ingredient. U.S. Pat. No. 4,011,172 discloses the use of water-insoluble plastic sheeting to make pouches for containing chlorine bleaches. These pouches are prepared with pores or perforations to facilitate release of the active ingredient. In this manner, rapid, substantially uncontrolled release of active ingredient is experienced. A "Consumer Products" bulletin published in 1977 by General Electric Company makes reference to the use of a pouch made from microporous polyethylene for introducing disinfectant materials into swimming pools. While release of the total disinfectant concentration occurs over a period of days, uniformity of release over that period is not indicated. U.S. Pat. No. 3,710,795 discloses various heat shrinkable polymeric membranes, including polyethylene, polypropylene, polyvinyl chloride, ethylene/vinyl acetate/vinyl alcohol terpolymers, and the like, which coat drugs distributed throughout solid polymeric matrixes comprising polymethacrylates, rubbers, hydrophilic hydrogels, crosslinked polyvinyl alcohol, and the like and thereby control the release thereof. This more involved technique relies upon the specific combination of permeation characteristics of the outer membrane and the inner matrix.

It is seen, therefore, that most prior art pouches exhibit a less-than desirable release mode for applications which require a prolonged release of active ingredient. Such application areas include chemical release into swimming pools; pesticide release into aquatic media; bactericide, detergent and/or dyestuff release into toilet tanks; and the like. Thus, the rate of release from these prior art systems either is instantaneous or is initially high followed by a rapid decline with a passage of time. Such a pattern of exponential decay may be referred to as "first-order decay". As a result, the amount of released agent may initially exceed the amount required for effective activity, thereby wasting active ingredient, while at some later time it may be inadequate for the task. Gradually diminishing and varying release rates are observed rather than the desired constant, uniform, controlled release of active ingredient.

The latter difficulties are of particular pertinence to most existing methods for swimming pool chlorination. Such methods rely on the dissolution rate of chlorinating agent which depends to a large extent on the flow rate, tablet shape, pH and temperature. Dissolution of tablet is again a first order process, which in practical terms would give a diminishing amount of active ingredient as time proceeds. As a result, an excess amount of chlorinating agent is usually delivered at the beginning in order to ensure a sufficient chlorine level at a later stage. This causes unnecessary waste of active ingredient. Depending on the frequency and mode of application substantial waste of chlorinating agent can result.

It is, therefore, the prime object of this invention to provide pouches for delivery of active ingredients which provide a substantially uniform, controlled release of said ingredients.

It is a further object to provide such pouches which avoid an initial high rate of release in favor of a "zero-order" release.

It is a still further object to provide a polymeric material for such pouches whose physical characteristics are well-suited for the preparation thereof and for the release of diverse types of active ingredient.

It is another object to provide pouches which can be prepared by economical and efficient procedures.

Various other objects and advantages of this invention will become apparent from the following description thereof.

I have now discovered that by utilizing cold water-insoluble polyvinyl alcohol as the polymeric film for the preparation of such pouches, release of active ingredient into an aqueous medium can be achieved according to a "zero-order" pattern. Thus, constant release of the active ingredient is attained. The aqueous medium plasticizes the film and lowers the glass transition temperature thereof such that the diffusive rate of active material through the pouch can be of practical value. The film then meters the transport of active ingredient to the surrounding aqueous medium via the diffusion mechanism at a constant rate for a prolonged and controllable period of time until substantially all the active ingredient has been released from the pouch. This is in contrast to the prior art systems which, as previously noted, generally exhibit a gradually diminishing level of release of active ingredient.

The immediate advantage one can realize from this in terms of swimming pool application is that a membrane system with constant release rate would be able to eliminate overchlorination generally associated with conventional chlorine tablets yet still maintain an effective chlorine level. In addition, the gas impermeable nature of dry PVA film makes the elimination of fuming and direct handling of chlorinating agent by the use of the PVA pouch an added advantage.

Furthermore, cold water-insoluble polyvinyl alcohol is particularly well-suited for these purposes. Its dry strength and heat sealability facilitate its handling and production. Its exceedingly high wet tensile strength maintains the integrity of the product during its lifetime, thereby significantly reducing the brittleness and rupture previously encountered. It is suitable for use with a wide variety of both liquid and solid active ingredients. Of primary importance, its high equilibrium water content, i.e., degree of swelling, enables it to function as an exceptional release membrane.

The cold water-insoluble polyvinylalcohol (PVA) film is selected so as to exhibit excellent dry and wet strength and, primarily, effective and practical active ingredient permeability. Thus, applicable PVA should be at least about 99% hydrolyzed and should exhibit a degree of swelling in water of from about 120 to 200%, and preferably from about 140 to 180%.

$$\left( \text{Degree of Swelling} = \frac{\text{weight of swelling solvent in polymer}}{\text{weight of dry polymer}} \right)$$

The designation "cold water-insoluble" for the applicable PVA is intended to indicate that the film will substantially maintain its integrity in water which is at temperatures up to about 60° C. Such a range clearly includes substantially all practical applications for the instant pouches. PVA film which exhibits these various characteristics is commercially available or, in the alternative, can be readily prepared by techniques well known to those skilled in the art.

In order to further ensure maintenance of film integrity, it is desired that the pH environment of the wet PVA film be in the range of from about 2.5 to 10, preferably 4 to 10, and optimally near neutral pH. The possibility of gradual erosion and hydrolysis of the film outside the above noted range could result in premature rupture of the pouches. Such pH environment is determined by the nature of the active solution in the pouch or by the nature of the aqueous medium.

A wide variety of liquid and solid active ingredients are applicable for use in the pouches of this invention. Such ingredients include detergents; bleaches; chlorinating agents; pesticides such as insecticides, herbicides, algaecides, and the like; drugs; dyes; other chemicals; and the like. Of particular interest are the introduction of chlorinating agents such as trichloroisocyanuric acid, sodium dichloroisocyanurate, potassium dichloroisocyanurates, monochlorotetra (monopotassium dichloroisocyanurate) and mixtures thereof into swimming pools and water towers, and the introduction of dyes and/or bactericides into toilet tanks, urinals, and the like. The prolonged, constant release of these active ingredients into their respective aqueous media is particularly well-suited to the particular needs of these environments. In order to establish practical release rates, it is required that the active ingredient exhibit a minimum water solubility. The exact degree of water solubility will vary widely depending on the release requirements, i.e., on the nature of the environment into which the active ingredient is released, on the amount of active ingredient required for the particular application, on the desired interval of release, and the like. It can thus range from extremely small solubility to total water solubility.

Methods for preparing the instant pouches are well known to those skilled in the art. A typical procedure is disclosed in U.S. Pat. No. 2,888,787. This procedure involves the use of two films, one of which is sucked into a cup to form a cavity. The cavity is then filled with active ingredient, the air in the filled package completely evacuated and the other film sealed across the top to form the sealed package. A typical procedure for use with liquid ingredients is disclosed in U.S. Pat. No. 3,785,556. This procedure involves filling an elongated envelope sealed at one end with the liquid, under predetermined static pressure, and the subjecting of a selected liquid-filled portion thereof to heat sealing and severing from the remainder of the envelope. The disclosures of these patents are deemed to be incorporated into the instant specification. Variations on these procedures are, of course, acceptable if a sealed and evacuated package results therefrom.

The pouches are then ready for introduction into the aqueous medium. The transition period required for the initially dry PVA pouch to become fully swollen plus the time required for the first trace of active ingredient to dissolve and diffuse across the swollen film will vary according to the nature of the active ingredient and the thickness of the PVA film. Generally periods of up to about one hour will be sufficient to initiate diffusion of the active ingredient. It is to be noted, however, that removal of the pouch from contact with the aqueous medium and subsequent return thereto after reasonable periods of time will not create an additional time lag if the package has not totally dried. Rather, virtually instantaneous and continuous release is observed in these instances. At the point of release, a steady state is created whereby the inward osmotic flow of water is balanced by the outward diffusion of active ingredient and/or the outward pressure flow of solution. The release rate of active ingredient from the pouch can be controlled by selecting the appropriate thickness and area of PVA film for the specific active ingredient. While these variables will be selected by the practitioner in accordance with his own particular needs, typical dry film thickness range from about 1.5 to 5.0 mils. The total period of release will be determined by the amount of active ingredient.

Regarding the amount of active ingredient, it is desired that the maximum ratio of weight of active ingredient to pouch volume be about 50 lb/ft.$^3$, and preferably about 40 lb/ft$^3$. Such an approach is more realistic than a weight to surface area ratio, particularly when dealing with chlorinating agents. Since the latter generate gas when in wet formulation, increased chemical weight within a limited pouch volume which would exceed the above noted weight to volume ratio would tend to result in an increase of internal pressure and eventual breakage of the pouch. In terms of total weight of active ingredient, the practitioner may decide on this provided that the above noted ratio is adhered to and that said weight is not too great so as to cause pouch tearing during ordinary handling.

As an optional feature with chlorinating agents, up to about 30% by weight, of the chlorinating agent can be replaced by an alkali metal halide, such as sodium chloride, in order to facilitate the osmotic water intake from the surrounding aqueous medium, thereby promoting efficient contact between the film and the reservoir. Such a system provides virtually instantaneous and constant release eliminating the initial time lag in release that may be experienced.

The applicable areas of use of these pouches are noted hereinabove. Of particular value is the release of chlorinating agents into swimming pools and water towers. The ease of use, the elimination of unpleasant fuming during handling of the chlorinating agent, the availability of pre-determined amounts of active ingredients and the prolonged, controlled delivery all serve to facilitate this area of utility. A further area of utility is the so-called "under the rim" application in toilet bowls. Thus, the pouch is filled with fragrance plus diluent and positioned beneath the rim of the bowl. Fragrance is released when water flows over the pouch and ceases when the pouch is dry. Accordingly, release when needed is achieved. This method of operation can be described as the controlled release of active ingredient periodically into an aqueous environment and its immediate vicinity through intermittent activation of the PVA pouch by water. This is to be contrasted with the normal mode of operation of the PVA pouch which would be the controlled release of active ingredient continuously into an aqueous environment. It should be recognized that a variety of active ingredients are available for release through this mechanism, such as fragrances, disinfectants, detergents, bactericides, dyestuffs and the like. It should also be noted that there are other areas of use which are equally applicable to such intermittent use.

In order to avoid adverse effects during production and shipping resulting from the hygroscopic nature of PVA, it is possible to package the PVA pouch in another moisture barrier bag. Polyethylene, polystyrene and polyvinyl chloride are examples of barrier films which may be utilized in this regard.

The following examples will further illustrate the embodiments of this invention. In these examples, all parts given are by weight unless otherwise noted.

EXAMPLE I

This example illustrates the preparation of typical pouches of the instant invention.

The pouches described in the following table were prepared utilizing 99% hydrolyzed cold water insoluble polyvinyl alcohol. The PVA has a degree of swelling of 140% in water and a wet thickness of 2.6 mils.

| Active Ingredient | Pouch Load (lb) | Load to Pouch Volume Ratio (lb/ft$^3$) |
|---|---|---|
| 1. Acid blue No. 9 powder | 4.4 × 10$^{-4}$ | 4.32 |
| 2. 50% Acid blue No. 9 paste | 6.6 × 10$^{-3}$ | 8.61 |
| 3. Liquid bactericide (50% quaternary ammonium chloride) | 0.016 | 29.30 |

Each pouch was then immersed in a well stirred beaker containing one liter of water. Aliquots were taken at periodic intervals and concentration checked on a spectrophotometer. The blue dye and bactericide exhibited maximum absorbance at 629 nm and 290 nm, respectively. The water was exchanged two to three times a day. The release was monitored for at least 100 hours at room temperature.

Figure 2:
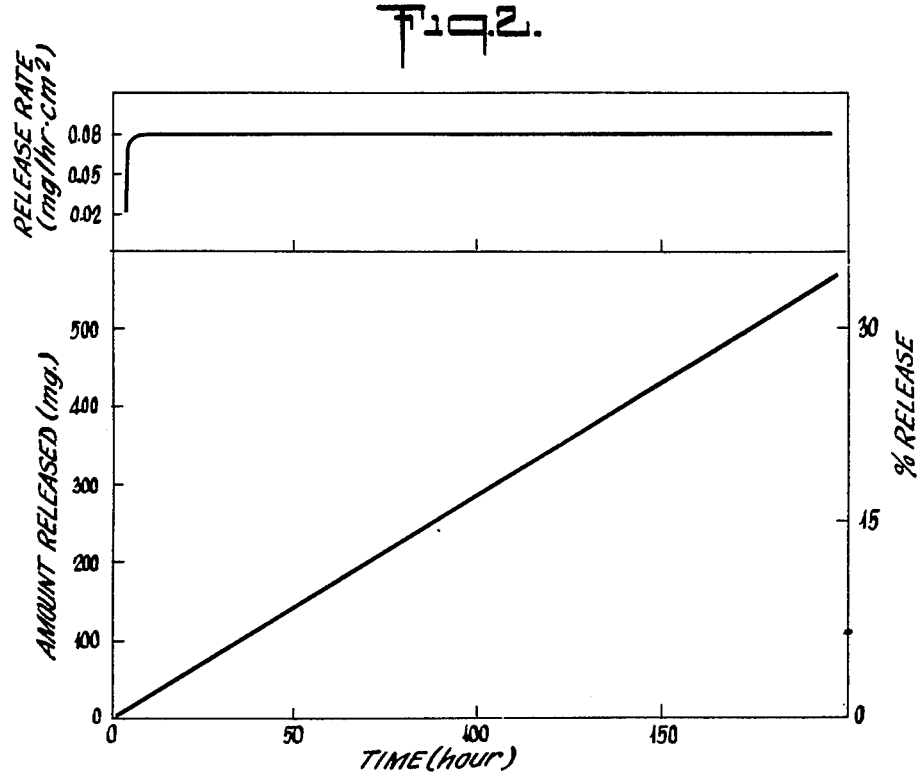
Figure 3:
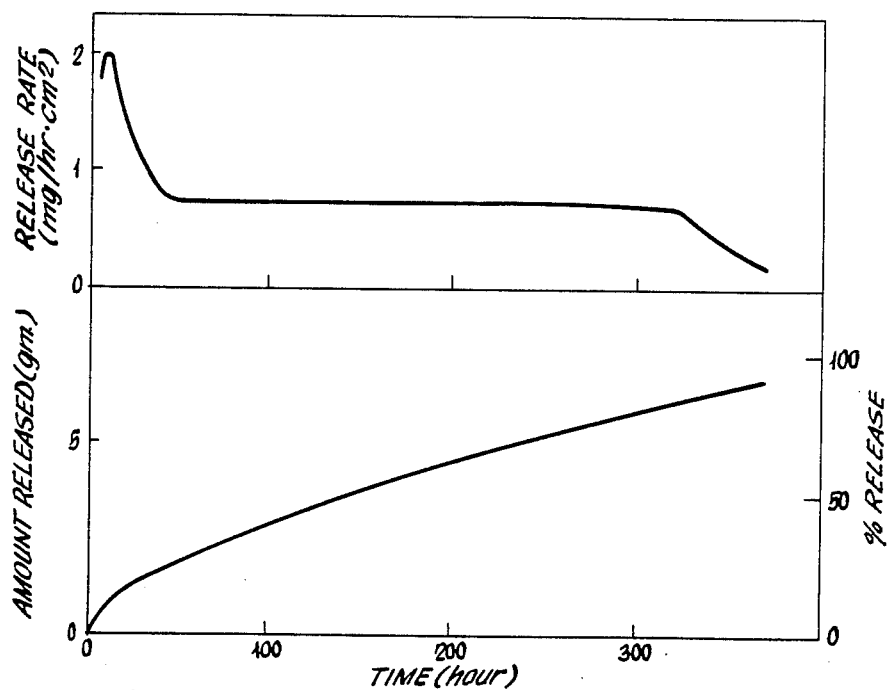

The release patterns of these systems are depicted, respectively, in FIG. 1 (pouch 1), FIG. 2 (pouch 2) and FIG. 3 (pouch 3). In each instance, an initial lag time for transition from dry pouch to a fully swollen one was observed. Thereafter, substantially constant release patterns into the aqueous medium were exhibited.

EXAMPLE II

Pouches having an effective area of 47.5 cm$^2$ were prepared from cold water insoluble polyvinyl alcohol film having a dry thickness of two mils. In this instance, 2,4-dichlorophenoxyacetic acid herbicide was utilized as the active ingredient. The 2,4-D has a water solubility of 290 ppm at room temperature. Two release experiments were conducted; one using a gram load of 2,4-D in powder form and the other using a gram load of 2,4-D in tablet form. The sealed pouches were then subjected to the testing procedure described in Example I.

The test results revealed zero-order release rates of 2.24 mg/cm$^2$.day and 2.22 mg/cm$^2$.day, respectively, for the powder charged and tablet charged pouches. Thus, efficient and controlled herbicide delivery was obtained in each case.

EXAMPLE III

This example provides a series of experiments relating to the release of chlorinating agents from typical pouches of the instant invention.

A. Pouches containing powdered trichloroisocyanuric acid (TCCA) were prepared according to the variables set forth in the following table. These pouches were then tested according to the procedure of Example I, the results thereof also being set forth in the following table. Since the main reaction product with TCCA in water is hypochlorous acid, a methyl orange method for chlorine determination was used.

| PVA Dry Thickness (mils) | Load to Pouch Volume Ratio (lb/ft$^3$) | Pouch Load (lb) | Release Rates (mg/cm$^2$ day) | | |
|---|---|---|---|---|---|
| | | | TCCA | OCl$^{31}$ | CA* |
| 2 | 8.84 | 0.022 | 22.9 | 34.4 | 25.6 |
| 3 | 10.68 | 0.021 | 15.0 | 22.6 | 17.2 |
| 5 | 7.30 | 0.023 | 13.0 | 19.7 | 14.2 |

*CA - cyanuric acid

These release rates were indicative of zero-order chlorine release patterns.

Similar data was developed with additional chlorinating agents and is presented in the following table:

| Chlorinating Agent | PVA film dry thickness (ml) | Pouch Load (lb) | Loading to Volume ratio (lb/ft$^3$) | NaCl content (%) | Release Rates Mg OCl$^{31}$/cm$^2$day |
|---|---|---|---|---|---|
| Trichloro-isocyanurate | 3 | 0.011 | 18.33 | — | 30.97 |
| | 4 | 0.011 | 18.33 | — | 23.21 |
| Potassium dichloro-isocyanurate | 3 | 0.022 | 27.98 | — | 64.03 |
| | 4 | 0.015 | 24.98 | — | 64.03 |
| 20/80 physical blend of agents 1 and 2 above | 3 | 0.018 | 22.10 | — | 51.45 |
| | 4 | 0.015 | 31.52 | — | 39.32 |
| | 4 | 0.022 | 34.37 | — | 37.31 |
| Monotrichloro-tetra (mono-potassium-dich- | 3 | 0.007 | 19.17 | — | 48.95 |
| | 3 | 0.007 | 21.59 | — | 43.04 |
| | 3 | 0.022 | 26.56 | — | 49.30 |

-continued

| Chlorinating Agent | PVA film dry thickness (mil) | Pouch Load (lb) | Loading to Volume ratio (lb/ft³) | NaCl content (%) | Release Rates Mg OCl³¹/cm²day |
|---|---|---|---|---|---|
| loroiscyanurate) | 4 | 0.013 | 11.46 | — | 24.0 |
| Monotrichloro- | 3 | 0.011 | 27.48 | 5 | 51.0 |
| tetra (mono- | 3 | 0.022 | 7.78 | 10 | 53.95 |
| potassium-dich- | 3 | 0.022 | 40.0 | 15 | 58.27 |
| loroiscyanurate) | 3 | 0.022 | 29.66 | 20 | 45.26 |
|  | 3 | 0.022 | 28.80 | 30 | 44.80 |
|  | 4 | 0.011 | 12.66 | 5 | 25.95 |
|  | 4 | 0.011 | 14.26 | 5 | 29.34 |
|  | 4 | 0.011 | 23.09 | 5 | 38.07 |

B. In view of the susceptibility of the PVA films to chlorine attack due to the localization of high concentration of $OCl^-$ in the pouch, stability of these pouches was examined. Thus, patches of 2, 3 and 5 mil PVA film were immersed in bath solutions containing saturated solutions of various chlorinating agents. Samples were withdrawn periodically to determine film failure. The test results are presented in the following table:

| Chlorinating Agent | pH of Saturated Solution | PVA Film Thickness (mil) | Stability (Days) |
|---|---|---|---|
| Trichloroisocyanuric Acid | 2.6-3.0 | 2 | 10 |
| Trichloroisocyanuric Acid | 2.6-3.0 | 3 | 24 |
| Trichloroisocyanuric Acid | 2.6-3.0 | 5 | 30 |
| Sodium Dichloro-isocyanurate | 7.0 | All | stable-indefinitely |
| Potassium Dichloro-isocyanurate | 6.0 | All | stable indefinitely |
| Monochloro-tetra mono-potassium dichloroisocyanurate | 4.4-4.6 | All | stable indefinitely |
| Calcium Hypochlorite | 12.3 | All | rapid disintegration |

It is thus seen that despite the the difficulty of chlorine attack, the pouches can last and release chlorine for commercially acceptable periods of time. It is only when the pH environment is outside the range of from about 2.5-10 that difficulty is encountered in maintaining pouch stability.

C. For disinfection purpose, the presence of available chlorine at 1 ppm level in swimming pools is generally required. Owing to the continuous elimination of available chlorine by various factors such as sunlight, wind, temperature fluctuation and bathing contaminants, it was necessary to have an appropriate mechanism for the dispensing of chlorinating agent to replenish the required chlorine level. Depending on the method used, the dispensing can range from a shock treatment by calcium hypochlorite to sophisticated feeder or skimmer dispenser with regulated pump cycles. All the existing methods rely on the dissolution rate of chlorinating agent which depends to a large extent on the flow rate, tablet shape, pH and temperature. Dissolution is a first order process, which, in practical terms, would generally give a diminishing amount of active ingredient. As a result, an excess amount of chlorinating agent is usually delivered at the beginning in order to ensure a sufficient chlorine level at a later stage. This causes unnecessary waste of active ingredient. Depending on the frequency and mode of application, substantial waste of chlorinating agent can result.

Figure 4:
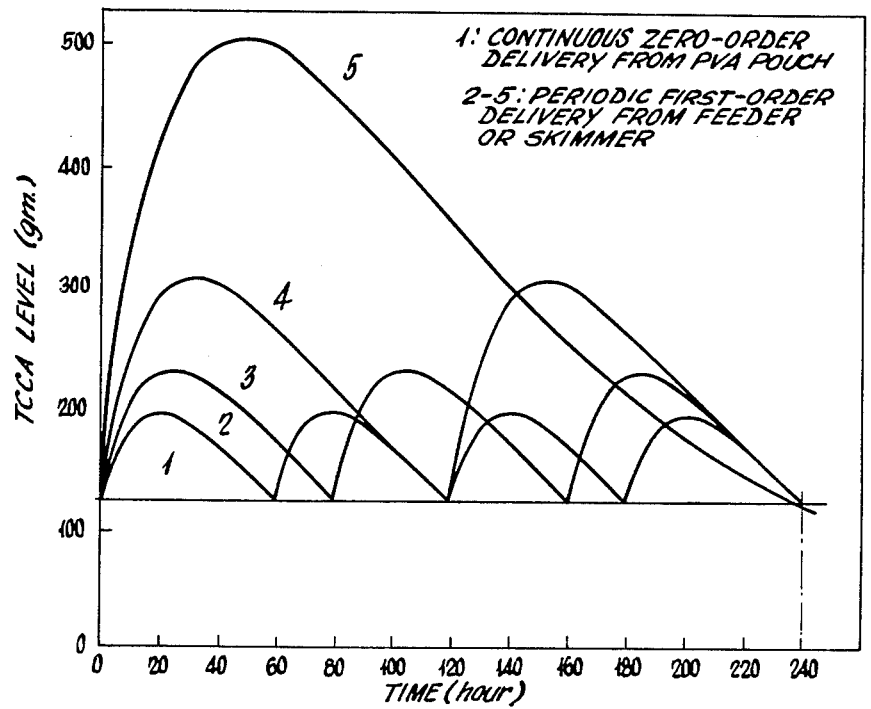

A computer program was therefore established to simulate chlorine levels in the pool under various delivery and elimination conditions. Accordingly, a TCCA level simulation was obtained for a 22,000 gallon pool based on the initial condition of 125 gm. TCCA (1 ppm of $OCl^-$) in the pool at zero time generated either by a shock treatment or a previous chlorinating cycle and the requirement of maintaining a minimum 125 gm. TCCA level at all time for ten days. The dispensing systems used in the simulation were zero-order PVA pouch and zero-order and first-order periodic feeds from a skimmer or feeder. These results are presented in FIG. 4 and the following table. It can be seen that, under the simulation conditions, the zero-order continuous delivery from the PVA pouch gave a near constant TCCA level of 125 gm. (1 ppm of $OCl^-$) at all times, while other periodic delivery systems tended to over-chlorinate the pool as high as five times the required chlorine level depending on the frequency and mode of application. The areas between the TCCA level of continuous zero-order delivery and that of other periodic delivery systems in FIG. 4 represent the actual waste of chlorinating agent. These values are also summarized in the table. The pouch that was utilized in these experiments was prepared from cold water-insoluble PVA film having a three mil dry thickness.

| Comparison of TCAA Requirement for the Maintenance of a 125 gm TCCA (1 ppm $OCl^-$) level in a 22,000 Gallon Pool at 80° C. for 10 days* | | |
|---|---|---|
| Mode of Application | Total Amount of TCCA required (gm.) | Waste of Active Ingredient (%) |
| First-order, continuous delivery | 2500 | 190.7 |
| First-order, periodic delivery, once every 5 days | 1800 | 109.3 |
| First-order, periodic delivery, once every 3.3 days | 1470 | 70.9 |
| First-order, periodic delivery, once every 2.5 days | 1320 | 53.5 |
| Zero-order, periodic delivery 8 hr/day pump cycle | 960 | 11.6 |
| Zero-order, continuous delivery from PVA pouch | 860 | 0 |

*Initial TCCA concentration in the pool: 125 gm

This data thus reveals the efficient and economic delivery potential provided by the PVA pouches of this invention with regard to the release of chlorinating agents into swimming pools.

D. In addition to Part C, a determination was made as to the comparative effects of utilizing conventional chlorine tablets or the instant pouches in the chlorination of swimming pools. The criteria utilized was the maintenance of a 1 ppm chlorine level in a 22,000 gallon pool for a period of 10 days. The method of delivery for the tablets was by feeder, skimmer and floating feeder, while the method of delivery for the PVA pouch was a floating feeder. PVA film of 4 mil thickness was utilized. It was determined that 5.5 pounds of monotrichloro-tetra(monopotassium dichloroisocyanurate) in tablet form was required as contrasted with 2.8 pounds of the same agent in pouch form. A substantial savings is therefore achieved with the instant pouches. In addition, constant, uniform delivery was observed with the pouches.

EXAMPLE IV

The room temperature release character of pyribenzamine, an antihistamine, from cold water insoluble polyvinyl alcohol pouches (2 mils thick) was studied in distilled water. The characteristics of the pouch and the release data results are presented in the following table. Concentration of the pyribenzamine was measured directly by use of a UV-visible spectrophotometer during the test procedure as described in Example I.

| $D(cm^2/sec)$ | k | Loadings (lb) | Load to Pouch Volume Ratio (lb/ft$^3$) | $t_1$(hr) | $t_{50}$(hr) | $t_{90}$(hr) |
|---|---|---|---|---|---|---|
| $2.56 \times 10^{-9}$ | 149 | $5.1 \times 10^{-4}$ | 8.66 | 0.50 | 2.55 | 4.9 |
| $2.13 \times 10^{-9}$ | 121 | $6.3 \times 10^{-4}$ | 10.24 | 0.70 | 3.5 | 6.7 |

D-diffusion coefficient of drug in film
k-distribution coefficient of drug in film
$t_1$-time lag
$t_{50}$-50% release time
$t_{90}$-90% release time The $t_{50}$ and $t_{90}$ values for the release of pyribenzamine are thus seen to meet the requirements of an oral dose form. It can be anticipated that a PVA tablet coating would yield a zero order release system. In this instance, the solubility of the pyribenzamine and the strength of the PVA film would limit the osmotic water influx so as to maintain the integrity of the release system.

Variations may be made in proportions, procedures and materials without departing from the scope of the invention as defined by the following claims.

What is claimed is:

1. A sealed pouch for the controlled release of chlorinating agent into an aqueous medium having a maximum of 60° C. consisting of an envelope of cold water insoluble polyvinyl alcohol in film form, said polyvinyl alcohol being at least about 99% hydrolyzed and having a minimum degree of swelling in water of about 120%, and enclosed therein an effective amount of a chlorinating agent having at least a minimum solubility in water, the pH of said aqueous solution of chlorinating agent being in the range of from 2.5–10.0; said sealed pouch having a maximum ratio of weight of active ingredient to pouch volume of about 50 lb/ft$^3$.

2. The pouch of claim 1, wherein said pH range is 4.0–10.0.

3. The pouch of claim 1, where a maximum of about 30% by weight, of said chlorinating agent is replaced by an alkali metal halide.

4. The pouch of claim 1, wherein said chlorinating agent is trichloroisocyanuric acid, sodium dichloroisocyanurate, potassium dichloroisocyanurate or mixtures thereof.

5. The pouch of claim 4, wherein said chlorinating agent is monotrichloro-tetra(monopotassium dichloroisocyanurate).

6. A method for the controlled release of chlorinating agent into an aqueous medium having a maximum temperature of 60° C. consisting of the steps of (1) preparing a sealed pouch of cold water-insoluble polyvinyl alcohol in film form, said polyvinyl alcohol being at least about 99% hydrolyzed and having a minimum degree of swelling in water of about 120%, and enclosed therein an effective amount of a chlorinating agent having at least a minimum solubility in water; said sealed pouch having a maximum ratio of weight of active ingredient to pouch volume of about 50 lb/ft$^3$; (2) introducing said sealed pouch into said aqueous medium; (3) swelling said polyvinyl alcohol film; (4) introducing the aqueous medium into said pouch to dissolve said chlorinating agent; said aqueous solution of chlorinating agent having a pH in the range of 2.5–10.0; and (5) allowing said chlorinating agent to diffuse through said swollen film and be released into said aqueous medium; said release being capable substantially ceasing upon removal of the pouch from said aqueous medium and the drying thereof and being reinitiated upon renewed contact of the pouch with said aqueous medium.

7. The method of claim 6, wherein said pH range is 4.0–10.0.

8. The method of claim 6, wherein said aqueous medium is a swimming pool.

9. The method of claim 6, wherein introduction step (4) is on a non-continuous basis so as to provide intermittent diffusion acording to step (5).

10. The method of claim 6, wherein a maximum of about 30%, by weight, of said chlorinating agent is replaced by an alkali metal halide.

11. The method of claim 9, wherein said chlorinating agent is trichloroisocyanuric acid, sodium dichloroisocyanurate, potassium dichloroisocyanurate or mixtures thereof.

12. The method of claim 11, wherein said chlorinating agent is mono-trichloro-tetra(monopotassium-dichloroisocyanurate).

* * * * *